Figure 1:
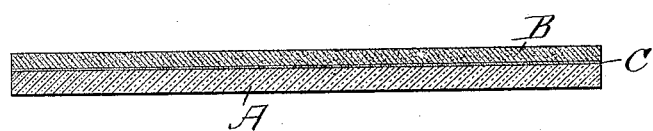

No. 804,853. PATENTED NOV. 21, 1905.
C. L. IRESON.
METHOD OF ATTACHMENT OF RUBBER AND LEATHER.
APPLICATION FILED MAR. 17, 1905.

WITNESSES:
M. E. Flaherty
M. V. Foley

INVENTOR:
Charles L. Ireson
by his attys
Clarke, Raymond & Coale.

UNITED STATES PATENT OFFICE.

CHARLES L. IRESON, OF BOSTON, MASSACHUSETTS.

METHOD OF ATTACHMENT OF RUBBER AND LEATHER.

No. 804,853.   Specification of Letters Patent.   Patented Nov. 21, 1905.

Application filed March 17, 1905. Serial No. 250,561.

*To all whom it may concern:*

Be it known that I, CHARLES L. IRESON, a citizen of the United States, and a resident of Boston, in the county of Suffolk and State of Massachusetts, have invented a new and useful Improvement in Methods of Attachment of Rubber and Leather, of which the following is a full, clear, and exact description, reference being had to the accompanying drawings, forming a part of this specification, in explaining its nature.

This invention relates to the herein-described method of uniting rubber and leather and whereby the two materials are permanently united to each other by a continuous, coherent, and tenacious bond.

In practicing the method the rubber and the leather which are to be united are selected as to shape, quality, and thickness for the use to which the product is to be applied. It is desirable that the leather should be prepared for union with the rubber by being freed from such oils and other matter as may in any way injuriously affect the rubber after the union. Certain kinds of leather as now tanned are relatively free, if not entirely free, from such injurious elements, and I mean leathers which are tanned by "chrome tannage," so called. Such leathers usually have a very close and fibrous texture and may be very flexible, tough, and somewhat yielding or elastic as well. The leather which is used may also be somewhat impregnated with sulfur, and this may be introduced during the tanning of the leather, as it is with certain tannages, or it may be specially introduced. The rubber that is united with the leather may be vulcanized stock—that is, stock which has been previously vulcanized—or it may be rubber compound of a vulcanizable character which is vulcanized at the time that it is united with the leather.

In practicing the invention a surface of the leather is prepared for the vulcanizing process by being coated with a thin surfacing or coating of rubber-cement uniformly applied. When this has become dried, it will be desirable to apply a second coating of the cement to the surface of the first coating. If previously-vulcanized rubber is to be united to the leather, its surface which is to be adjacent to the leather is also covered or coated with one or more coatings of rubber-cement, preferably dried upon it, and there is then employed between the two—that is, the vulcanized rubber and the leather—a thin bonding sheet or mixture of an unvulcanized rubber and sulfur or other vulcanizing agent, which should be continuous between the rubber and the leather. The three parts or sections—that is, the leather, the rubber, and the intermediate section—are then assembled together in a mold capable of compressing the sections together, and while so compressed they are subjected to heat, either dry or wet, in a vulcanizer and for any desired interval of time. This will depend upon the thickness of the rubber and the leather and upon the amount of sulfur employed and the degree of heat used. As a rule with wet vulcanization it will be desirable to protect the leather from direct contact of the moisture with it. In dry vulcanization such protection is not necessary. Of course a heat should not be used that shall act to burn, dry, or otherwise injure the leather.

Where the rubber is not vulcanized before it is united with the leather substantially the same steps are used in the preparation of the leather and the rubber, the rubber of course being in the nature of a vulcanizable compound which is vulcanized during its union with the leather. In this event the intermediate section between the rubber and the leather may not be used, as the surface of the unvulcanized stock adjacent to the leather will serve the purpose of the intermediate section—that is, it will carry the sulfur or other vulcanizing agent which combines the rubber on the leather with the leather and with the remainder of the rubber.

While I have mentioned the previous coating of the leather and rubber with a rubber-cement, I would not be understood as regarding this as an essential element of the invention, the principal features of which are, first, the selection of a quality of leather which shall stand heat and which shall be prepared for vulcanization, and, second, the use in conjunction therewith of an independent body or sheet of rubber vulcanizable compound which shall serve under heat and pressure to combine with the leather mechanically and chemically and unite it to the rubber under heat and pressure by a tenacious, coherent, and flexible bond.

I will now describe the invention in conjunction with the drawings, forming a part of this specification, wherein—

Figure 2:
Figure 3:
Figure 4:

Figure 1 represents in section the leather and rubber combined together by the vulcanizable sheet, forming, when vulcanized, the uniting bond. Fig. 2 represents in section the leather portion thereof; Fig. 3, in section the sheet of vulcanizing material which combines with the leather and with the rubber under pressure and heat, and Fig. 4 represents in section the rubber which is combined by means of the vulcanizing-sheet with the leather.

In the drawings, A is the rubber section, B the leather section, and C the uniting bond.

Having thus fully described my invention, I claim and desire to secure by Letters Patent of the United States—

1. The method of uniting rubber and leather herein described, the same consisting in treating leather freed of the oil or other elements which attack or are injurious to rubber when the leather is combined therewith, preparing such leather for the vulcanizing process and combining such leather chemically and mechanically, under heat and pressure, with a body of rubber or rubber compound by means of an interposed, independent sheet of vulcanizable-rubber compound.

2. The method of uniting rubber and leather herein described, the same consisting in treating leather denuded of destructive oils and other elements liberated by heat and supplying the leather with an element of a vulcanizable compound, and uniting said leather with a body of rubber or rubber compound, under heat and pressure, by means of an independent sheet of vulcanizable-rubber compound interposed between the leather and the rubber or rubber compound and chemically and mechanically united to both.

CHARLES L. IRESON.

Witnesses:
F. F. RAYMOND, 2d,
M. V. FOLEY.